April 1, 1958  F. A. CAMPBELL  2,828,547
HOLE AND SLOT GAUGE
Filed Nov. 18, 1953
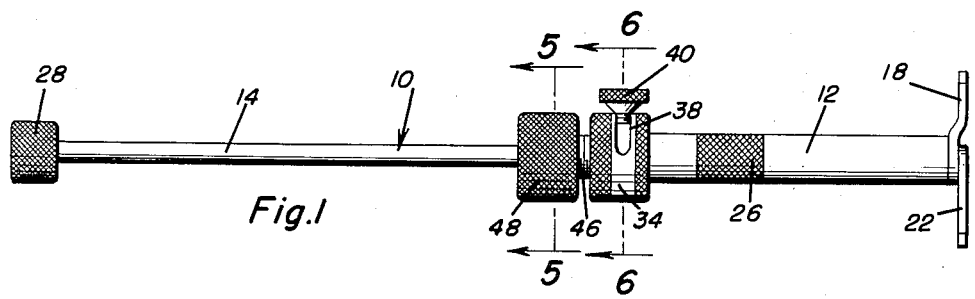
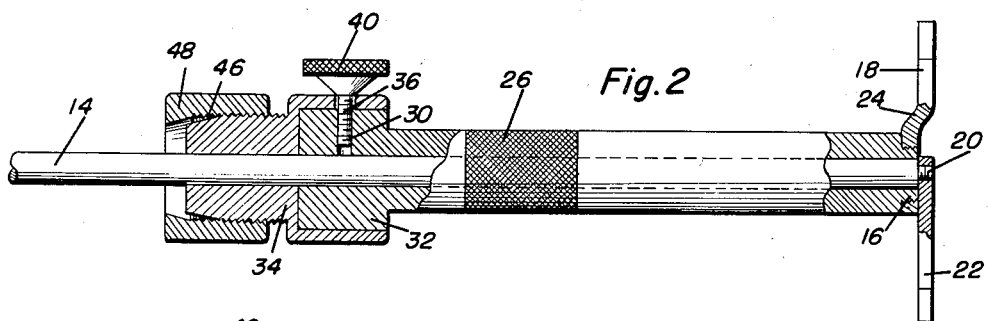
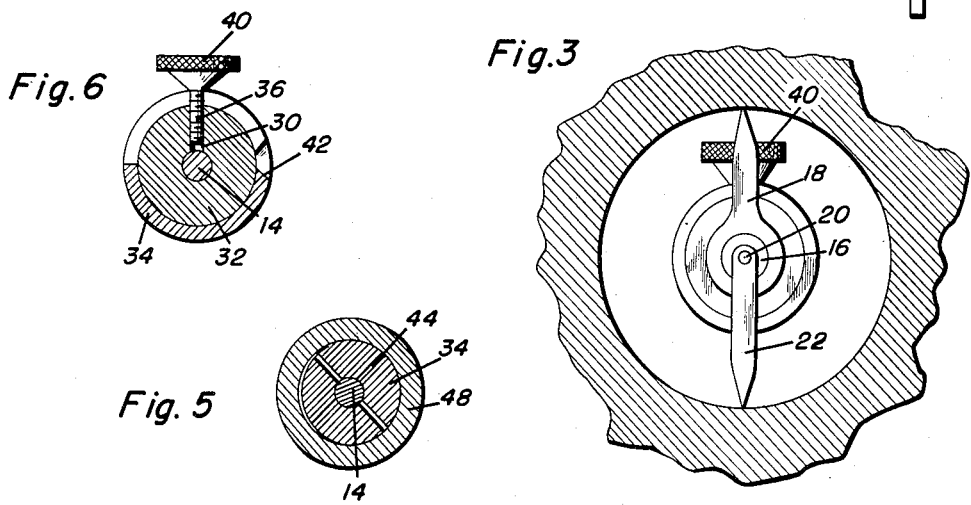
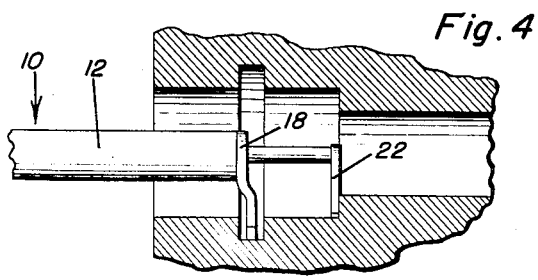
Floyd A. Campbell
INVENTOR.

United States Patent Office 2,828,547
Patented Apr. 1, 1958

2,828,547

HOLE AND SLOT GAUGE

Floyd A. Campbell, Springfield, Ohio

Application November 18, 1953, Serial No. 392,941

2 Claims. (Cl. 33—143)

This invention relates to a hole and slot gauge and more specifically provides a device for measuring the width and depth of slots or apertures.

The primary object of this invention is to provide a hole and slot gauge having a pair of pointers for indicating and measuring the width, depth of slots, and the interior diameter of apertures.

Yet another object of this invention is to provide a slot and hole gauge which will measure the width and depth of shoulders and which has a wide range of utility.

A further object of this invention is to provide a hole and slot gauge which is simple in construction, easy to manipulate, universal in use and adjustment and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the gauge of this invention;

Figure 2 is a detail view similar to Figure 1 with portions thereof in section;

Figure 3 is an end elevational view looking at the right hand end of the device of Figure 2 showing the gauge used in measuring the internal diameter of a hole;

Figure 4 shows the gauge in use in measuring the depth of a hole or the longitudinal length of a peripheral slot;

Figure 5 is a transverse, vertical section taken substantially along section line 5—5 of Figure 1; and, Figure 6 is a transverse, vertical section taken substantially along section line 6—6 of Figure 1.

Referring now specifically to the drawings, it will be seen that the numeral 10 generally designates the hole and slot gauge of this invention including a tubular sleeve member 12 and a rod member 14 being slidably and rotatably received in the tubular sleeve 12 wherein the sleeve 12 is approximately half the length of the rod member 14. The sleeve member 12 is provided with an externally threaded and reduced end portion 16 having a pointer 18 threadedly secured thereto. The rod member 14 has a reduced and externally threaded end portion 20 having a pointer 22 threadedly secured thereto wherein the pointers 18 and 22 may be removed and replaced with various sized pointers wherein the device may be used to measure and test various sized work or apertures. Each of the pointers 18 and 22 is pointed or sharpened on the ends, and the pointer 18 has an offset portion generally indicated by the numeral 24, wherein the pointers 18 and 22 are in alignment throughout their working length. The tubular sleeve 12 has a knurled portion 26 and the rod member 14 has an enlarged knurled handle 28 on one end thereof for manipulation of the gauge 10. Remote from the pointer 18, the tubular sleeve 12 is provided with an internally threaded bore 30 extending transversely into the tubular member 12 at enlarged portion 32. An end portion 34 is positioned over the enlarged portion 32 and is held thereon by a threaded member 36 engaging a slot 38 in the end member 34 and the internally threaded bore 30. The threaded member 36 has a knurled portion 40 and a tapered portion extending from the knurled portion 40 to the threaded portion 36. One end of the slot 38 is provided with a tapered countersunk portion 42 for receiving the tapered portion of the screw member 36 for locking the end portion 34 and the tubular sleeve 12 in angular adjustment. The other end of the end portion 34 is slotted at 44 and includes a tapered external threaded portion 46 for receiving a complementary tapered internally threaded clamp nut 48 which is knurled on its outer surface for ease of manipulation. It will be seen that the nut 48 clamps the fingers of the end portion 34 formed by the slots 44 into gripping engagement with the rod 14 thereby adjusting the longitudinal adjustment of the rod 14 and by suitable manipulation of the screw member 36, the angular adjustment between the rod 14 and the tubular sleeve 12 may be adjusted, thereby adjusting the angular relationship between the pointers 18 and 22, wherein the pointers 18 and 22 may be utilized as shown in Figure 3 or as shown in Figure 4, as desired.

From the foregoing, the operation of the device will be readily understood, and it will be seen that the pointers may be used to measure the internal diameter of an aperture as shown in Figure 3, or the depth of a socket or the like. Further, it will be seen that the gauge 10 may be used to determine the width or depth of slots and utilized wherever an inside or an outside measurement is desired. The device may be constructed of readily obtainable materials usually employed in a tool of this nature which are well known in the tool industry.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gauge comprising an elongated tubular sleeve having a transverse pointer extending radially at one end thereof, the other end of said sleeve having an end portion rotatably mounted thereon, an elongated rod slidably and rotatably mounted in said sleeve, said rod having a radially extending pointer at one end thereof, said rod extending beyond the end portion of the sleeve, said end portion being tapered and externally threaded and including a plurality of longitudinal slots, an internally threaded and tapered clamp nut on said end portion for collapsing the end portion into clamping engagement with said rod, means for clamping the end portion to the sleeve in angular position about the longitudinal axis thereof for locking the pointers in longitudinal and angularly adjusted position.

2. A hole and slot gauge comprising a tubular sleeve having a transverse pointer on one end, a rod slidably mounted in said sleeve and extending from both ends of said sleeve, a transverse pointer on the end of said rod adjacent the other pointer, and means for adjusting the relative positions of said pointers, said other end of said sleeve including a plurality of longitudinal slots and a tapered externally threaded end portion and an internally threaded clamp nut for collapsing said end portion into clamping engagement with said rod, said tapered end portion being rotatably mounted on said sleeve, an annular slot provided in said end portion, a screw positioned in said slot and engageable with a threaded bore in said sleeve wherein said end portion and rod may be angularly adjusted thereby adjusting the angular relationship of said pointers wherein the diameter and depth of openings may be measured.

References Cited in the file of this patent

UNITED STATES PATENTS

| | | |
|---|---|---|
| 455,644 | Sloane | July 7, 1891 |
| 1,110,879 | Brown | Sept. 15, 1914 |
| 2,563,440 | Wilson et al. | Aug. 7, 1951 |

FOREIGN PATENTS

| | | |
|---|---|---|
| 74,141 | Switzerland | Jan. 16, 1917 |
| 201,195 | Canada | June 22, 1920 |
| 486,137 | Germany | Nov. 8, 1929 |